United States Patent [19]
Hasegawa

[11] Patent Number: 5,434,916
[45] Date of Patent: Jul. 18, 1995

[54] VOICE ACTIVITY DETECTOR FOR CONTROLLING ECHO CANCELLER

[75] Inventor: Atsushi Hasegawa, Tokyo, Japan

[73] Assignee: NEC Corporation, Tokyo, Japan

[21] Appl. No.: 169,634

[22] Filed: Dec. 20, 1993

[30] Foreign Application Priority Data

Dec. 18, 1992 [JP] Japan .................... 4-339056

[51] Int. Cl.[6] .............. H04M 1/00; H04M 9/00; H04M 9/08; H04J 1/00
[52] U.S. Cl. .................... 379/406; 379/407; 379/410; 370/32.1
[58] Field of Search .............. 379/3, 398, 399, 408, 379/407, 410, 411; 370/32, 32.1; 375/10; 381/71

[56] References Cited

U.S. PATENT DOCUMENTS

| | | | |
|---|---|---|---|
| 3,497,641 | 2/1970 | Helder et al. | 379/3 |
| 4,469,916 | 9/1984 | de Bergh et al. | 379/406 |
| 4,918,727 | 4/1990 | Rohrs et al. | 379/410 |
| 5,343,521 | 8/1994 | Jullien et al. | 379/406 |
| 5,353,398 | 10/1994 | Sendyk et al. | 375/410 |

FOREIGN PATENT DOCUMENTS

0053202 6/1982 European Pat. Off. .
0371567 6/1990 European Pat. Off. .

Primary Examiner—Stephen Chin
Assistant Examiner—Paul Loomis
Attorney, Agent, or Firm—Sughrue, Mion, Zinn, Macpeak & Seas

[57] ABSTRACT

In a voice activity detector for an echo canceller, a difference (a−b) is detected between a voltage at the receive path of a four-wire circuit of a hybrid transformer and a voltage at the transmit path of the four-wire circuit to produce a first difference signal, and an echo return loss (ERL) estimate is derived from the first difference signal. The first difference signal is compared with the ERL estimate to produce a first binary signal. A difference (b−c) is detected between the voltage at the transmit path and an output voltage of the echo canceller to produce a second difference signal, and an echo return loss enhancement (ERLE) estimate is derived from the second difference signal. The second difference signal is compared with the ERLE estimate to produce a second binary signal which forms together with the first binary signal one of a plurality of combinations of binary levels. The estimator of the echo canceller is enabled in response to a predetermined one of the combinations of binary levels and disabled in response to the other combinations.

6 Claims, 4 Drawing Sheets

VOICE ACTIVITY DETECTOR FOR CONTROLLING ECHO CANCELLER

BACKGROUND OF THE INVENTION

1. Field of the Invention

The present invention relates generally to echo cancellars for two-wire-four-wire hybrid circuit, and more specifically to a voice activity detector for controlling the estimation process of an echo canceller under varying talking modes.

2. Description of the Related Art

Echo cancellers are used in transmission systems where a two-wire channel is coupled to a four-wire channel by a hybrid transformer for cancelling undesired waveforms, or echo introduced to the desired signal by the transhybrid coupling resulting from impedance imbalance between these channels. For echo cancellation, a replica of echo is estimated and subtracted from a signal in the transmit (go) path. A signal in the receive (return) path of the four-wire circuit is used for estimating the echo replica and this is only achieved during the absence of a signal in the transmit path of the four-wire circuit since it obstructs the estimation process. A voice activity detector is usually provided to bring the estimation process to a halt whenever the presence of a signal is sensed in the transmit path.

Since there is a singing margin of 6 dB or greater in telephone exchange lines, the signal level at the transmit port path of the four-wire circuit is lower than the signal level at the receive path by more than 6 dB in the absence of a signal in the transmit path. When voice activities exist simultaneously in both of these paths, they are brought to an equal signal level. The prior art voice activity detector has two input terminals for receiving the near-end, transmit signal T and the far-end, receive signal R and operates by sensing the presence of the T and R signals to inhibit the estimation process of the echo canceller.

However, if the echo return loss (ERL) is 10 dB and the level of receive signal R is −10 dBm0, for example, the level of echo is −20 dBm0. If echo estimation is performed in the simultaneous presence of T and R signals and the level of transmit signal T is −20 dBm0 in the absence of an echo, the actual signal level at the input of the voice activity detector will be about −17 dBm0 due to the presence of an echo. Because of the 3-dB enhancement compared to the echo level of −20 dBm 0, the apparent echo return loss is 7 dB. If the echo return loss is equal to or more than 6 dB and this value is designed into the voice activity detector, the simultaneous presence of T/R signals would not be precisely detected.

SUMMARY OF THE INVENTION

It is therefore an object of the present invention to provide a voice activity detector and a method for controlling the echo estimation process of an echo canceller at optimum timing.

According to the present invention, there is provided a voice activity detector for controlling the echo estimation process of an echo canceller. In the circuit arrangement a difference is detected between a voltage at the receive path of a four-wire circuit of a hybrid transformer and a voltage at the transmit path of the four-wire circuit to produce a first difference signal, and an echo return loss (ERL) estimate is derived from the first difference signal. The first difference signal is compared with the ERL estimate to produce a first binary signal. A difference is detected between the voltage at the transmit path and an output voltage of the echo canceller to produce a second difference signal, and an echo return loss enhancement (ERLE) estimate is derived from the second difference signal. The second difference signal is compared with the ERLE estimate to produce a second binary signal which forms together with the first binary signal one of a plurality of combinations of binary levels. The echo estimation process is enabled in response to a predetermined one of the combinations of binary levels and disabled in response to the other binary level combinations.

Preferably, the combinations of the first and second binary signals derived from the ERL and ERLE estimates, respectively, are analyzed to produce first and second updown control signals with which first and second updown counters are controlled to produce a first and a second full count signal, respectively, when they reach a full count. On the other hand, an ERL estimate value is stored in a first memory, and a difference is detected between it and the first difference signal and then compared with a first reference value. A third updown counter is varied in accordance with a result of the comparison to produce a third full count signal when it reaches a full count. The stored ERL estimate is updated by incrementing it by a unit value in response to the third full count signal and decrementing it by a unit value in response to the first full count value. An ERLE estimated value is stored in a second memory, and a difference is detected between it and the second difference signal and then compared with a second reference value. A fourth updown counter is varied in accordance with a result of the comparison and a fourth full count signal is generated when it reaches a full count. The stored ERLE estimate is updated by incrementing the stored ERLE estimate by a unit value in response to the fourth full count signal and decrementing it by a unit value in response to the second full count value.

BRIEF DESCRIPTION OF THE DRAWINGS

The present invention will be described in further detail with reference to the accompanying drawings, in which.

DETAILED DESCRIPTION

Figure 1:
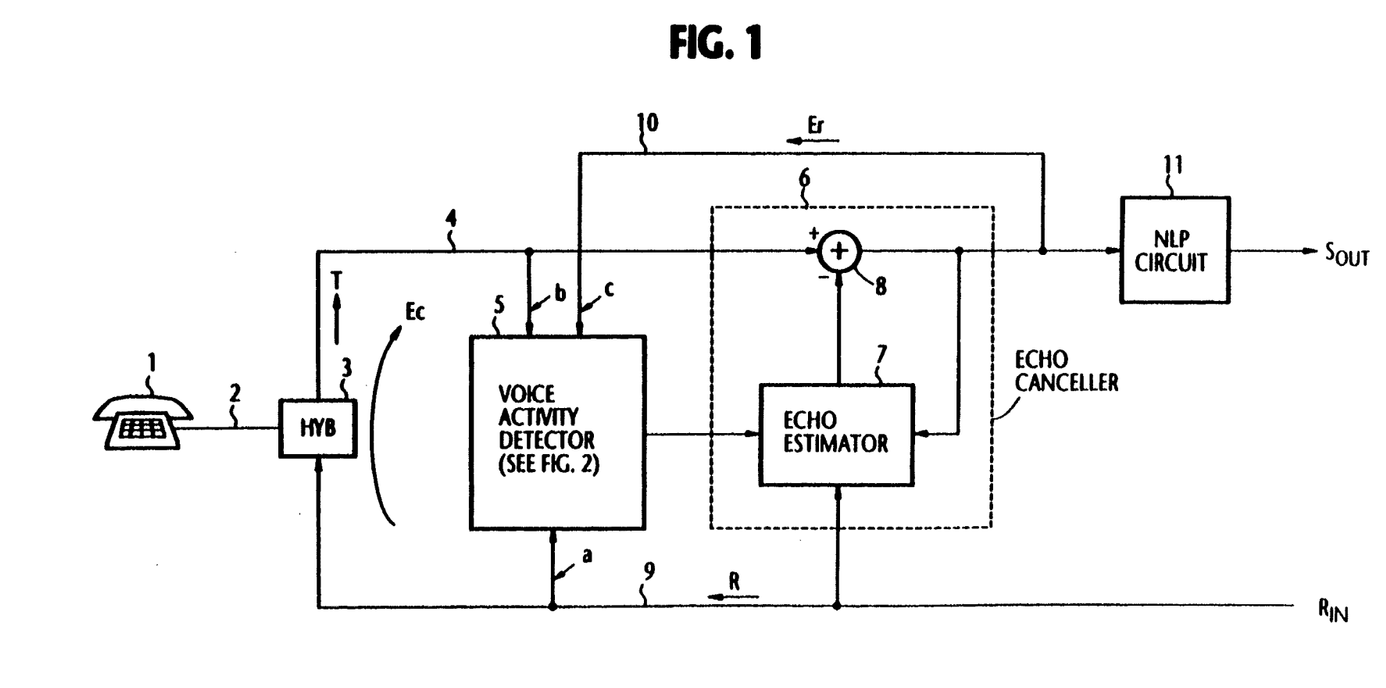
FIG. 1 is a block diagram of a subscriber line interface circuit where a voice activity detector of the present invention is connected to an echo canceller.

Referring to FIG. 1, there is shown a subscriber line interface circuit embodying the present invention. A subscriber station 1 is connected through a two-wire subscriber loop 2 to the two-wire terminal of a hybrid circuit, or two-wire-four-wire converter 3 which is connected to a four-wire transmission line, A transmit signal T from the station 1 is passed through the transmit path 4 of the hybrid circuit to a voice activity detector 5 of the present invention as well as to an echo canceller 6 of known design. Echo canceller 6 has an estimator 7 and a subtractor 8 to which the transmit path 4 is connected. Echo estimator 7 receives a signal from the distant end through the receive path 9 of the transmission line as a reference signal and the output of subtractor 8 as a residual echo Er and provides an estimate of the echo. The estimated echo is supplied as an echo replica to subtractor 17 where it is subtracted from the transmit signal. Echo estimator 7 responds to an enable/disable signal from the voice activity detector 5 to control its estimation process. According to the present invention, the output of subtractor 8 is applied through lead 10 to the voice activity detector 5. A nonlinear processor 11 is connected to the output of subtractor 8 to remove small residual echoes from the transmit signal before it is sent to the transmission line.

Figure 2:
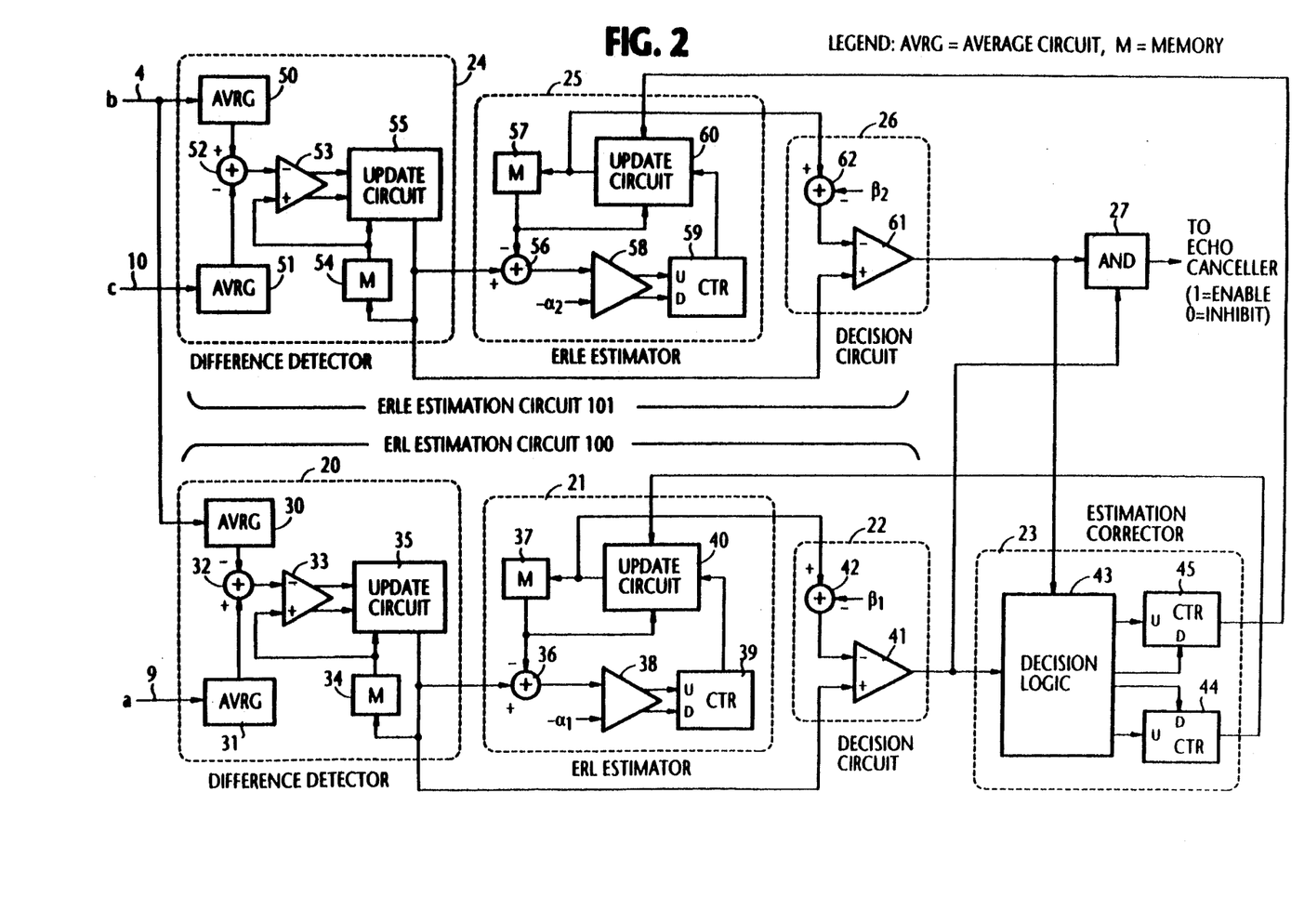
FIG. 2 is a block diagram of the voice activity detector of FIG. 1.

Details of the voice activity detector 5 are shown in FIG. 2. It comprises generally an echo return loss (ERL) estimation circuit 100 and an echo return loss enhancement (EPLE) estimation circuit 101. The ERL estimation circuit 100 includes a level difference detector 20, an ERL estimator 21, and a decision circuit 22, and the ERLE estimation circuit 101 includes a difference detector 24, an ERLE estimator 25, and a decision circuit 26.

The difference detector 20 receives voltages on the transmit and receive paths 9 and 4 and detects the difference between their average values, and the difference detector 24 receives voltages on leads 4 and 10 and detects the difference between their average levels.

The talking modes of a four-wire circuit are broken down into first, second, third and fourth talking modes. The first talking mode indicates that no voice activity exist in both of the transmit and receive paths. During this mode, voltages "a" and "b" (FIG. 1) at receive and transmit paths 9 and 4 are zero, and voltage "c" at the output of subtractor 8 is likewise zero, hence the inputs to the difference detectors 20 and 24 are a−b=0 and b−c=0, respectively.

The second talking mode indicates that voice activity exists only in the receive path. In the second mode in which the echo estimator is to be exclusively enabled, the inputs to the difference detector 20 are given by a−b=R−Ec and the inputs to the difference detector 24 are given by b−c=Ec−Er, where R is the receive signal on path 9, Ec is the echo through hybrid circuit 3 from path 9 to path 4, and Er is the residual echo appearing at the output of subtractor 8.

The third talking mode indicates that voice activity exists only in the transmit path. In this mode, the inputs to the difference detectors 20 and 24 are given by a−b=−T and b−c=0, respectively, where T is the transmit signal on path 4. The fourth talking mode indicates that voice activity exists both in the transmit and receive paths. During this mode, if echo estimator 7 is disabled properly, the inputs to the difference detectors 20 and 24 will be given by a−b=R−T−Ec and b−c=Ec−Er, respectively.

Figure 3A:
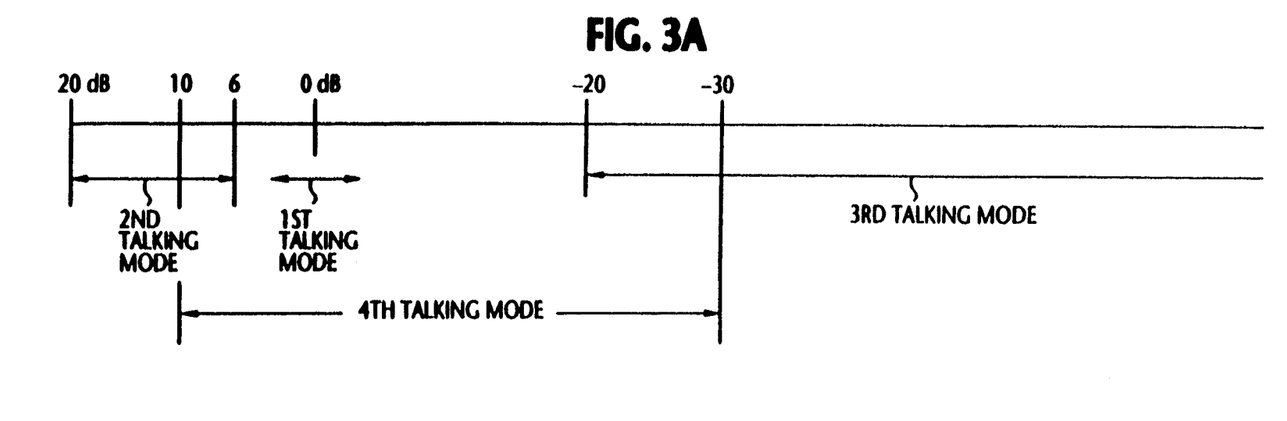
FIG. 3A is an illustration of the ranges of echo return loss for different talking modes.
Figure 3B:
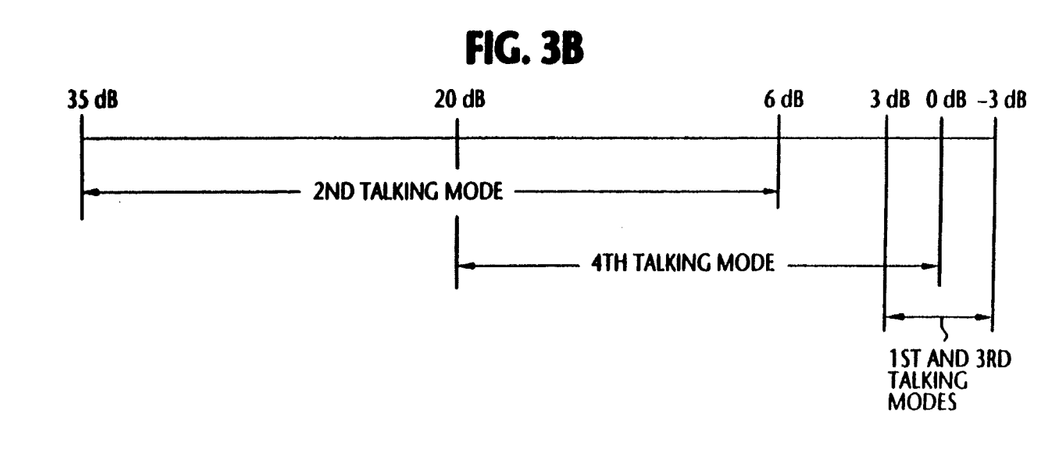
FIG. 3B is an illustration of the ranges of echo return loss enhancement for different talking modes.

As shown in FIG. 3A, the ERL difference values vary in the range between +3 dB and −3 dB during the first talking mode, between 6 dB and 20 dB during the second talking mode, between −20 dB and −60 dB during the third talking mode, and between 10 dB and −30 dB during the fourth talking mode. The ERLE difference values vary in the range between 3 dB and −3 dB (FIG. 3B) during the first talking mode, between 6 dB and 35 dB during the second talking mode, between 3 dB and −3 dB during the third talking mode, and between 20 dB and 0 dB during the fourth talking mode.

As will be described later, the ERL estimator 21 holds a maximum value of ERL estimate for a given input difference, while the ERLE estimator 25 holds a maximum ERLE estimate for a given input difference. By using the outputs of the ERL and ERLE estimators each of the decision circuits 22 and 26 produces a logic-1 output as a likelihood indicator of the second talking mode and a logic-0 output as a likelihood indicator of the other talking modes. The outputs of the decision circuits 22 and 26 are applied to an estimation corrector 23 to change the direction of control on the ERL and ERLE estimation processes according to a combination of logic outputs of the decision circuits 22 and 26. Estimation corrector 23 includes a decision logic 43 and a pair of up-down counters 44, 45. Decision logic 43 decodes tile logic states of the decision circuits 22, 26 to identify them as one of the first, second, third and fourth talking modes, and drives the up-down counters 44 and 45 in either direction of count. Each of counters 44 and 45 produces an output when a full count value is reached. The outputs of counters 44 and 45 are applied respectively to the ERLE and ERL estimators 21 and 25 to modify their estimation control processes. An AND gate 27 is connected to receive logic signals from the decision 28 circuits 22 and 26 to produce a logic-1 output for enabling the echo estimator 7 during the second talking mode and a logic-0 for disabling it during the other talking modes.

Difference detector 20 includes a pair of average circuits 30 and 31 respectively connected to leads 4 and 9 to produce a pair of output signals respectively representing the average level of voltages. The difference between the average levels of the signals is detected by a subtractor 32 and applied to a comparator 33 where it is compared with the output of a memory 34 in which the most recent difference value is stored. The memory 34 is constantly updated by an update circuit 35 in response to the logic levels of the output of comparator 33 and the stored value of memory As specifically shown in FIG. 4, the update circuit 35 comprises switches 70 and 71 whose positions depend on first and second outputs of comparator 33, respectively. A pair of read-only memories 72 and 73 is connected to the output of memory 34. Each of these ROMs is of contents addressable type. In the ROM 72 are stored difference signals whose decibel values are greater than corresponding signals stored in memory 34 by 1 dB and a corresponding signal is read out of ROM 72 in response to the output of memory 34, while in the ROM 73 are stored difference signals whose decibel values are smaller than the output of memory 34 by 1 dB and a corresponding signal is read out of ROM 73 in response to the output of memory 34. The outputs of ROMs 72 and 73 are connected to the first and second terminals of the switch 71, respectively. The first output of comparator 33 is a 0 when the value stored in memory 34 equals the difference detected by subtractor 32 and, in response, switch 70 is changed to the first terminal for coupling the output of memory 34 to the first terminal of switch 71. The first output of comparator 33 changes to a 1 when the stored value of memory 34 is either lower or greater than the subtractor 32 output and, in response, the switch 70 is changed to the second terminal for coupling the output of ROM 72 to the first terminal of switch 71. The second output of comparator 33 is a 0 when the stored value of memory 34 is equal to or higher than tile subtractor 32 output and, in response, switch 71 is changed to the first terminal for coupling the output of switch 70 to the memory 34. The second output of comparator 33 changes to a 1 when the stored value of memory 34 is lower than the subtractor 32 output and, in response, switch 71 is changed to the second terminal for coupling the output of ROM 73 to the memory 34.

Figure 4:
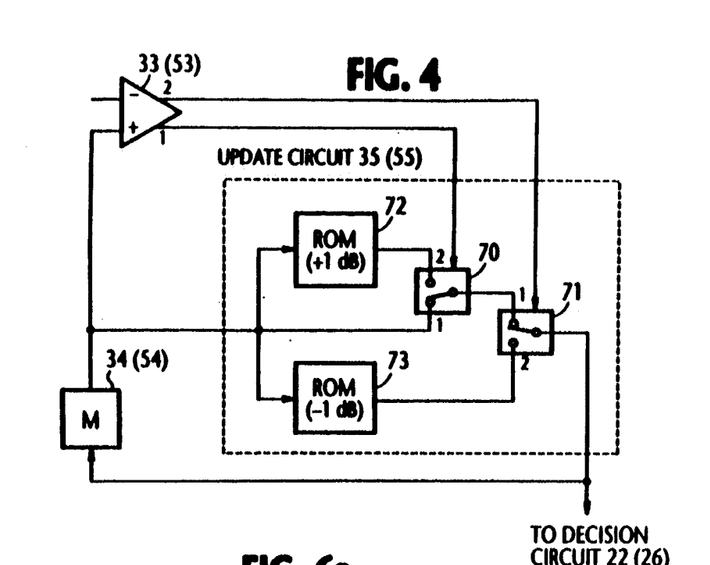
FIG. 4 is a block diagram of the update circuit of each of the difference detectors of FIG. 1.

Therefore, if the difference output of subtractor 32 is greater than the most recent value of memory 34, the latter is incremented by 1 dB and if it is smaller than the most recent value, the latter is decremented by 1 dB. As the process continues in this way, the difference dB value stored in memory 34 approaches an appropriate value which is stabilized against the rapidly varying speech signals. The output of update circuit 35 thus assumes the same value as the content of memory 34 as long as the output of subtractor 32 equals the most recent value of memory 34. The output of update circuit 35 is supplied as an output of difference detector 20 to the ERL estimator 21 and decision circuit 22.

The ERL estimator 21 includes a subtractor 36 having a positive input connected to the output of difference detector 20 and a negative input connected to the output of a memory 37 in which an estimated ERL value is stored, so that the output of subtractor 36 represents the difference between an ERL estimate and the output of difference detector 20. The output of subtractor 36 is connected to a comparator 38 where it is compared with a threshold value "$-\alpha_1$" which is determined from the range of the second talking mode shown in FIG. 3A. When the output of subtractor 36 is higher than $-\alpha_1$, the ERL estimate is considered that it still has not acquired a sufficient value and comparator 38 increments an updown counter 39 by a predetermined trimming value. When the 28 output of subtractor 36 is lower than $-\alpha_1$, it is considered that an ERL estimate of magnitude which is more than sufficient has been stored in memory 37, and comparator 38 causes counter 39 to decrement by the predetermined trimming value. When the subtractor 36 output is equal to $-\alpha_1$, comparator 38 recognizes that the ERL estimate has attained a steady state value indicative of the second talking mode and the contents of counter 39 are unaltered. When counter 39 reaches a predetermined full count value, it changes the logical state of its output which is supplied to an update circuit 40 to increment the ERL estimate of memory 37.

Figure 5:
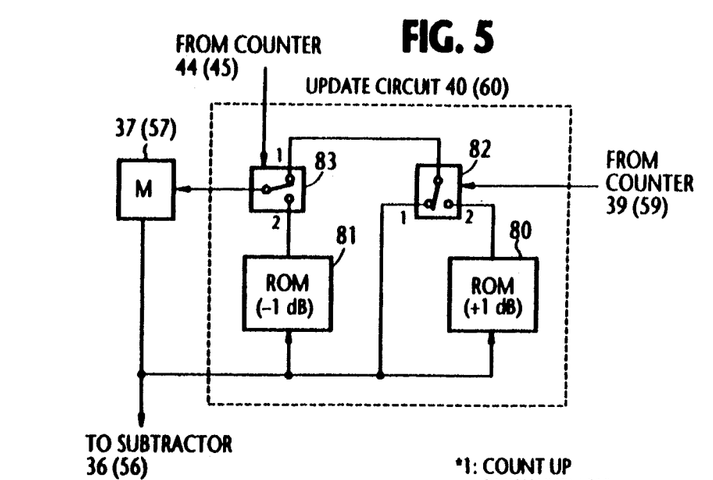
FIG. 5 is a block diagram of the update circuit of each of the ERL and ERLE estimators of FIG. 1.

As shown in FIG. 5, the update circuit 40 includes contents-addressable read-only memories 80 and 81. In the ROM 80 are stored EPL estimates whose decibel values are greater than most recent EPL values by 1 dB and in the ROM 81 are stored EPL estimates whose values are smaller than the current values by 1 dB. The output of memory 37 is connected to the inputs of these ROMs as an address signal to read out corresponding ERL estimates. An incremented ERL estimate is read out of ROM 80 in response to a corresponding current estimate and supplied to the first terminal of a switch 82 and a decremented estimate is likewise read out of ROM 81 corresponding to the current estimate and supplied to the first terminal of a switch 83 whose second terminal is connected to the output of switch 82.

The second terminal of switch 82 is connected direct to the output of memory 37 to select it as a current value. The output of updown counter 39 of ERL estimator 21 is applied to switch 82 when a full count is reached in counter 39 for coupling an incremented ERL estimate from ROM 80 through the second terminal of switch 83 to the current memory 37. On the other hand, the output of up-down counter 44 of estimation corrector 23 is connected to switch 83. In response to a full count reached in counter 44, switch 83 is changed in position to the first terminal for coupling a decremented ERL estimate from ROM 81 to memory 37. In this way, the content of memory 37 remains unchanged when switches 82 and 83 remain connected to their second terminal. The memory 37 is incremented by 1 dB when switch 82 is changed to the first terminal when a full count is reached in counter 39 or decremented by 1 dB when switch 83 is changed to the first terminal when a full count is reached in counter 44, whose operation will be described later. By appropriately determining the threshold value $\alpha_1$, the ERL estimation loop will hunt for a maximum ERL value which is eventually stored in memory 37.

The decision circuit 22 includes a comparator 41 and a threshold setting circuit implemented with a subtractor 42. The output of the ERL estimator 21 is coupled to the subtractor 42. A bias value of $\beta_1$ (typically 6 dB) is applied to subtractor 42 to be subtracted from the ERL estimate to supply a corrected ERL estimate to the comparator 41 as a threshold value. The output of difference detector 20 is compared against the threshold by comparator 41. A logic-1 output is produced by comparator 41 when the output of difference detector 20 is higher than the threshold, or a logic-0 output is produced when it is lower than the threshold.

The ERLE estimation circuit 101 is similarly constructed to the ERL estimation circuit 100. Difference detector 24 includes a pair of average circuits 50 and 51 respectively connected to leads 4 and 9 to produce a pair of output signals respectively representing the average level of voltages, The difference between the average levels of the signals is detected by a subtractor 52 and applied to a comparator 53 where it is compared with the output of a memory 54 in which the most recent difference value is stored. The memory 54 is constantly updated by an update circuit 55 in response to the logic levels of the output of comparator 53 and the stored value of memory 54.

As specifically shown in FIG. 4, the update circuit 55 comprises switches 70 and 71 whose positions depend on first and second outputs of comparator 53, respectively. A pair of read-only memories 72 and 73 is connected to the output of memory 54. Each of these ROMs is of contents addressable type. In the ROM 72 are stored difference signals whose decibel values are greater than corresponding signals stored in memory 54 by 1 dB and a corresponding signal is read out of ROM 72 in response to the output of memory 54, while in the ROM 73 are stored difference signals whose decibel values are smaller than the output of memory 54 by 1 dB and a corresponding signal is read out of ROM 73 in response to the output of memory 54. The outputs of ROMs 72 and 73 are connected to the first and second terminals of the switch 71, respectively. The first output of comparator 53 is a 0 when the value stored in memory 54 equals the difference detected by subtractor 52 and, in response, switch 70 is changed to the first terminal for coupling the output of memory 54 to the first terminal of switch 71. The first output of comparator 53 changes to a 1 when the stored value of memory 54 is either lower or greater than the subtractor 52 output and, in response, the switch 70 is changed to the second terminal for coupling the output of ROM 72 to the first terminal of switch 71. The second output of comparator 53 is a 0 when the stored value of memory 54 is equal to or higher than the subtractor 52 output and, in response, switch 71 is changed to the first terminal for coupling the output of switch 70 to the memory 54. The second output of comparator 53 changes to a 1 when the stored value of memory 54 is lower than the subtractor 52 output and, in response, switch 71 is changed to the second terminal for coupling the output of ROM 73 to the memory 54.

Therefore, if the output of subtractor 52 is greater than the most recent value of memory 54, the latter is incremented by 1 dB and if it is smaller than the most recent value, the latter is decremented by 1 dB. As the process continues in this way, the difference dB value stored in memory 54 approaches an appropriate value which is stabilized against the rapidly varying speech signals. The output of update circuit 55 thus assumes the same value as the content of memory 54 as long as the output of subtractor 52 equals the most recent value of memory 54. The output of update circuit 55 is supplied as an output of difference detector 24 to the ERLE estimator 25 and decision circuit 26.

The ERLE estimator 25 includes a subtractor 56 having a positive input connected to the output of difference detector 20 and a negative input connected to the output of a memory 57 in which an estimated ERLE value is stored, so that the output of subtractor 56 represents the difference between an ERLE estimate and the output of difference detector 24. The output of subtractor 56 is connected to a comparator 58 where it is compared with a threshold value "$-\alpha_2$" which is determined from the range of the second talking mode shown in FIG. 3B. When the output of subtractor 56 is lower than $-\alpha_2$, it is considered that an ERLE estimate of magnitude which is more than sufficient has been stored in memory 57, and comparator 58 decrements counter 59 by the predetermined trimming value. When the subtractor 56 output is equal to $-\alpha_2$, comparator 58 recognizes that the ERL estimate has attained a steady state value indicative of the second talking mode and the contents of counter 59 are unaltered. When counter 59 reaches a predetermined full count value, it changes the logical state of its output, which is supplied to an update circuit 60 to increment the ERLE estimate of memory 57.

The update circuit 60 has the same configuration as update circuit 40 (FIG. 5). EPLE estimates, whose decibel values are greater than most recent EPLE values by 1 dB, are stored in ROM 80 and EPLE estimates, whose values are smaller than the current values by 1 dB, are stored in ROM 81. The output of memory 57 is used an address input for reading corresponding ERLE estimates. An incremented ERLE estimate is read out of ROM 80 in response to a corresponding current estimate value and supplied to the first terminal of switch 82 and a decremented estimate value is likewise read out of ROM 81 corresponding to the current estimate and supplied to the first terminal of switch 83. The second terminal of switch 82 is connected direct to the output of memory 57 to select it as a current value. The output of updown counter 59 of ERLE estimator 25 is applied to switch 82 when a full count is reached in counter 59 for coupling an incremented ERLE estimate from ROM 80 through the second terminal of switch 83 to the current memory 57. On the other hand, the output of up-down counter 45 of estimation corrector 23 is connected to switch 83. In response to a full count reached in counter 45, switch 83 is changed to the first terminal for coupling a decremented ERLE estimate from ROM 81 to memory 57. In this way, memory 57 holds its value as long as switches 82 and 83 remain connected to their second terminal. The memory 57 is incremented by 1 dB when switch 82 is changed to the first terminal when a full count is reached in counter 59 or decremented by 1 dB when switch 83 is changed to the first terminal when a full count is reached in counter 65, whose operation will be described later. By appropriately determining the threshold value $\alpha_2$, the ERLE estimation loop will hunt for a maximum ERLE value which is eventually stored in memory 57.

The decision circuit 26 is similar to decision circuit 22. The output of the ERLE estimator 25 is coupled to the subtractor 62 and a bias value of $\beta_2$ (typically 12 dB) is subtracted from the ERLE estimate to supply a corrected ERLE estimate to comparator 61 as a threshold value. The output of difference detector 24 is compared against the threshold by comparator 61, which produces a logic-1 output when the output of difference detector 24 is higher than the threshold, or a logic-0 output when it is lower than the threshold.

The logic-1 output of the decision circuit 22 indicates that it is likely that the ERL estimate represents the second talking mode, and likewise the logic-1 output of the decision circuit 26 indicates that it is likely that the ERLE estimate represents the second talking mode. Therefore, the simultaneous occurrence of 1's at the outputs of decision circuits 22 and 26 provides a clear indication of the second talking mode.

Figure 6:
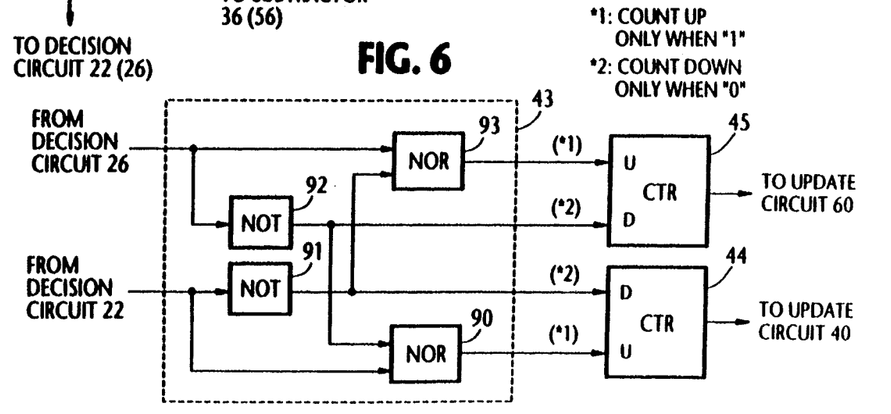
FIG. 6 a block diagram of the decision logic of FIG. 1.

As illustrated in FIG. 6, the decision logic 43 of estimation corrector 23 includes a pair of NOR gates 90 and 93 and a pair of NOT circuits 91 and 92. The output of decision circuit 22 is applied to NOR gates 90 and 93, one being direct to NOR gate 90 and the other through NOT gate 91 to NOR gate 93. The output of decision circuit 26 is likewise applied to NOR gates 90 and 93, one being direct to NOR gate 93, the other being through NOT gate 92 to NOR gate 90. The outputs of NOR gates 90 and 93 are connected to the up-count input of counters 44 and 45, respectively and the outputs of NOT circuits 91 and 92 are connected to the down-count input of counters 44 and 45, respectively. The up-down counters 44, 45 increment their count value by a predetermined amount only when a 1 is applied to their up-count input and decrement it by the predetermined amount only when a 0 is applied to their down-count input. When the up-down counters 44 and 45, reach their full count value they supply an output signal to the switch 83 of update circuits 40 and 60, respectively, to cause the ERL and ERLE estimates to decrement by 1 dB.

Figure 6A:
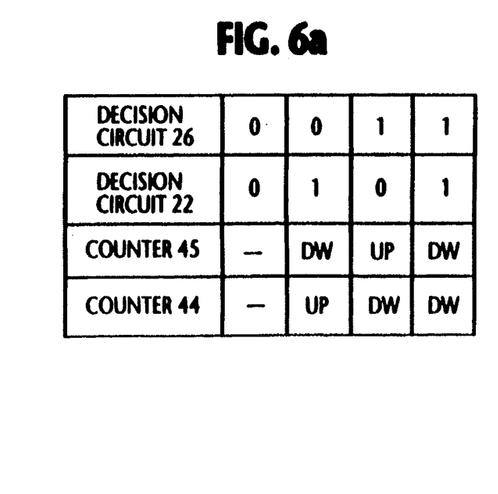
FIG. 6a is a truth table of the decision logic.

As indicated by a truth table shown in FIG. 6a, when the outputs of decision circuits 22 and 26 assume both logic 0, the contents of counters 44 and 45 remain unchanged. When the logic states of both decision circuits 22 and 26 are 1 and a 0, respectively, and counter 44 is incremented and counter 45 decremented. When the logic states of decision circuits 22 and 26 are 0 and 1, respectively, counter 44 is decremented and counter 45 incremented. When a logic 1 appears at the output of each decision circuit, both counters 22 and 26 are decremented.

What is claimed is:

1. A voice activity detector for controlling an estimator of an echo canceller which cancels an echo coupled to a transmit path of the four-wire circuit of a hybrid transformer from a receive path of the four-wire circuit, the voice activity detector comprising:

first difference detector means (20) for detecting a difference between a voltage at said receive path and a voltage at said transmit path and deriving therefrom a first difference signal;

first estimator means (21) for deriving an echo return loss (ERL) estimate from said first difference signal;

first decision means (22) for comparing said first difference signal with said ERL estimate and deriving therefrom a first binary signal;

second difference detector means (24) for detecting a difference between the voltage at said transmit path and an output voltage of said echo canceller and deriving therefrom a second difference signal;

second estimator means (25) for deriving an echo return loss enhancement (ERLE) estimate from said second difference signal;

second decision means (26) for comparing said second difference signal with said ERLE estimate and deriving therefrom a second binary signal which forms together with said first binary signal a plurality of combinations of binary levels; and means (27) for enabling said estimator in response to a predetermined one of the combinations of binary levels and disabling said estimator in response to said combinations other than said predetermined combination.

2. A voice activity detector as claimed in claim 1, further comprising estimate corrector means (23) for analyzing the combinations of said first and second binary signals, producing therefrom first and second correction signals and applying the first and second correction signals to said first and second estimator means, respectively, for correcting the ERL and ERLE estimates.

3. A voice activity detector as claimed in claim 1, further comprising:

decision logic means (43) for analyzing the combinations of said first and second binary signals and producing therefrom first and second control signals;

a first up-down counter (44) for varying a count in accordance with said first control signal and producing an output when a full count is reached; and a second up-down counter (45) for varying a count in accordance with said second control signal and producing an output when a full count is reached;

wherein said first estimator means (21) comprises:

a first memory (37) for storing an estimate value;

a first subtractor (36) for detecting a difference between said first difference signal and the estimate value stored in said first memory (37);

a first comparator (38) for comparing the difference detected by the first subtractor with a first reference value;

a third up-down counter (39) for varying a count in accordance with an output of said first comparator and producing an output when a full count is reached; and first update means (40) for deriving said ERL estimate by incrementing the estimate value stored in said first memory by a unit value in response to the output of said third up-down counter and decrementing the stored estimate value by a unit value in response to the output of said first up-down counter (44), wherein said second estimator means (25) comprises:

a second memory (57) for storing an estimate value;

a second subtractor (56) for detecting a difference between said second difference signal and the estimate value stored in said second memory (57);

a second comparator (58) for comparing the difference detected by the second subtractor with a second reference value;

a fourth up-down counter (59) for varying a count in accordance with an output of said second comparator and producing an output when a full count is reached; and second update means (60) for deriving said ERLE estimate by incrementing the estimate value stored in said second memory by a unit value in response to the output of said fourth up-down counter (59) and decrementing the stored estimate value by a unit value in response to the output of said second up-down counter (45).

4. A voice activity detector as claimed in claim 1, wherein said first difference detector means (20) comprises:

a first pair of averaging circuits (30, 31) for detecting an average value of the voltage at said receive path and an average value of the voltage at said transmit path;

a first subtractor (32) for detecting a difference value between the average values detected by said first pair of averaging circuits;

a first memory (34) for storing a difference value;

a first comparator (33) for detecting a difference between the difference value stored in said first memory (34) and the difference value detected by the first subtractor (32); and first update means (35) for deriving said first difference signal by varying the difference value stored in said first memory (34) in accordance with an output signal of said comparator (33), wherein said second difference detector means (24) comprises:

a second pair of averaging circuits (50, 51) for detecting an average value of the voltage at said transmit path and an average value of the output voltage of said echo canceller;

a second subtractor (52) for detecting a difference value between the average values detected by said second pair of averaging circuits;

a second memory (54) for storing a difference value;

a second comparator (53) for detecting a difference between the difference value stored in said second memory (54) and the difference value detected by the second subtractor (52); and second update means (55) for deriving said second difference signal by varying the difference value stored in said second memory (54) in accordance with an output signal of said second comparator (53).

5. A voice activity detector as claimed in claim 1, wherein said first decision means (22) includes means for subtracting a first predetermined value from the ERL estimate to produce a first threshold value and a comparator for comparing said first difference signal with said first threshold value and generating a binary digit at one of two discrete levels as said first binary signal depending on whether said first difference signal is higher or lower than said first threshold value,
wherein said first decision means (26) includes means for subtracting a second predetermined value from the ERLE estimate to produce a second threshold value and a comparator for comparing said second difference signal with said second threshold value and generating a binary digit at one of two discrete levels as said second binary signal depending on whether said second difference signal is higher or lower than said second threshold value.

6. In a voice activity detector for controlling an estimator of an echo canceller which cancels an echo coupled to a transmit path of the four-wire circuit of a hybrid transformer from a receive path of the four-wire circuit, a method for controlling the echo canceller comprising the steps of:
   a) detecting a difference between a voltage at said receive path and a voltage at said transmit path and deriving therefrom a first difference signal and detecting a difference between the voltage at said transmit path and an output voltage of said echo canceller and deriving therefrom a second difference signal;
   b) deriving an echo return loss (ERL) estimate from said first difference signal and deriving an echo return loss enhancement (ERLE) estimate from said second difference signal;
   c) comparing said first difference signal with said ERL estimate and deriving therefrom a first binary signal and comparing said second difference signal with said ERLE estimate and deriving therefrom a second binary signal which forms together with said first binary signal one of a plurality of combinations of binary levels; and
   d) enabling said echo estimator in response to a predetermined one of the combinations of binary levels and disabling said echo estimator in response to said combinations other than said predetermined combination.

* * * * *

UNITED STATES PATENT AND TRADEMARK OFFICE
CERTIFICATE OF CORRECTION

PATENT NO. : 5,434,916
DATED : July 18, 1995
INVENTOR(S) : Atsushi HASEGAWA

It is certified that error appears in the above-indentified patent and that said Letters Patent is hereby corrected as shown below:

Column 4, line 23, delete "tile" and insert --the--.

Column 4, line 32, delete "28".

Column 4, line 46, after "memory" insert --34--.

Column 5, line 6, delete "tile" and insert --the--.

Signed and Sealed this

Twenty-third Day of July, 1996

*Attest:*

BRUCE LEHMAN

*Attesting Officer*      *Commissioner of Patents and Trademarks*